United States Patent [19]

Hiramatsu

[11] Patent Number: 4,585,086
[45] Date of Patent: Apr. 29, 1986

[54] MOTOR VEHICLE FRAME MATERIAL AND FRAME CONSTRUCTION USING THE SAME

[75] Inventor: Kinuo Hiramatsu, Saitama, Japan

[73] Assignee: Honda Giken Kogyo Kabushiki Kaisha, Tokyo, Japan

[21] Appl. No.: 640,967

[22] Filed: Aug. 15, 1984

[30] Foreign Application Priority Data

Aug. 18, 1983 [JP] Japan .................. 58-151031
Aug. 18, 1983 [JP] Japan .................. 58-151035
Aug. 18, 1983 [JP] Japan .................. 58-151036

[51] Int. Cl.⁴ .................... B62D 61/02; B62K 1/00
[52] U.S. Cl. .................. 180/219; 280/281 R; 52/806
[58] Field of Search .......... 180/219; 280/281 R, 280/781; 52/806

[56] References Cited

U.S. PATENT DOCUMENTS 2,485,047 10/1949 Greig ..................... 52/806 X
3,084,770 4/1963 Wirsing, Jr. ............. 52/806 X
3,616,139 10/1971 Jones .................... 52/806 X
4,139,072 2/1979 Dawson .................. 180/219 X
4,334,589 6/1982 Asakura et al. ............. 180/219

FOREIGN PATENT DOCUMENTS 440639 12/1967 Switzerland ................ 52/806

Primary Examiner—William E. Wayner
Attorney, Agent, or Firm—Irving M. Weiner; Joseph P. Carrier; John J. Cantarella

[57] ABSTRACT

A frame material for a motor vehicle comprising a structure having an elongated hollow body of a rectangular cross section and a honeycomb member having a multiplicity of independent chambers and arranged in the hollow body such that central axes of the chambers are directed substantially perpendicularly to longer sides of the rectangular cross section of the hollow body. A frame construction for use in a motor vehicle includes the frame material as a main frame interconnecting a head pipe and a rear fork pivot rectilinearly in side elevation.

12 Claims, 17 Drawing Figures

MOTOR VEHICLE FRAME MATERIAL AND FRAME CONSTRUCTION USING THE SAME

BACKGROUND OF THE INVENTION

1. Field of the Invention

The present invention relates to a frame material for motor vehicles such as, for example, two-wheeled or three-wheeled motorcycles, and a frame construction using such a frame material for use in motor vehicles, especially those provided with riding saddles.

2. Description of the Prior Art

Frames used as chassis for two-wheeled motorcycles and the like require that a head pipe by which a front fork for a front wheel is angularly movably supported and a pivot by which a rear fork or swing arm for a rear wheel is swingably supported are rigidly coupled by a frame construction which is lightweight.

SUMMARY OF THE INVENTION

Accordingly, it is an object of the present invention to provide a motor vehicle frame material which has a desired degree of rigidity, is lightweight, and can be manufactured in a greatly reduced number of steps, and also to provide a frame construction made of a frame material such as for use in a motor vehicle having a saddle seat such as a motorcycle.

According to the present invention, a frame material for use in a motor vehicle includes a structure comprising an elongated hollow body having a rectangular cross section and a honeycomb member disposed in the hollow body and having a multiplicity of independent first chambers, the honeycomb member being arranged such that the first chambers have central axes directed substantially perpendicularly to longer sides of the rectangular cross section of the hollow body. The structure has at least one partition disposed in the hollow body and extending longitudinally therein, the partition defining a plurality of second chambers of a rectangular cross section extending longitudinally in the hollow body, the honeycomb member being arranged in each of the second chambers such that the central axes of the first chambers are directed substantially perpendicularly to longer sides of the rectangular cross section of each of the second chambers. The structure has a cavity extending longitudinally in the hollow body and free of the honeycomb member.

Further according to the present invention, a frame construction for use in a motor vehicle having front and rear forks includes a main frame including a head pipe for supporting the front fork angularly movably and a pivot for supporting the rear fork swingably, the main frame comprising a first structure composed of an elongated hollow body having a rectangular cross section and a honeycomb member disposed in the hollow body and having a multiplicity of independent divided chambers, the honeycomb member being arranged such that the divided chambers have central axes directed substantially perpendicularly to longer sides of the rectangular cross section of the hollow body, the main frame extending substantially rectilinearly in side elevation along a line interconnecting the head pipe and the pivot. The first structure has a cavity extending longitudinally in the hollow body and free of the honeycomb member. The frame construction includes a rear frame having one end coupled to a rear upper surface of the main frame and extending upwardly in a rearward direction, the rear frame and the main frame being joined together through flat surfaces having sufficient areas. The rear frame is positionally adjustable in a longitudinal direction of the main frame on a surface thereof to which the rear frame is joined. A pair of the first structures is arranged substantially symmetrically with respect to a vertical plane including a longitudinal central axis of the main frame, the first structures having distal ends coupled to the head pipe, and a cross member extending transversely and interconnecting the first structures, the pair of first structures and the cross member jointly constituting a substantially isosceles triangle configuration with the head pipe located in plan at a vertex subtending the cross member. The rear frame comprises a second structure composed of a honeycomb member and inner and outer plate members sandwiching the honeycomb member therebetween. A pair of the second structures is arranged substantially symmetrically with respect to the vertical plane including the longitudinal central axis of the main frame. The second structures include lower portions adjacent to ends thereof coupled to the main frame and spreading away from each other toward the ends coupled to the main frame. The outer plate members of the pair of second structures have lower edges joined to upper edges of inner sides of the pair of first structures. The pair of second structures has intermediate portions arranged close to each other, there being included a rear cushion unit having an upper end supported between the intermediate portions.

The above and other objects and features of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
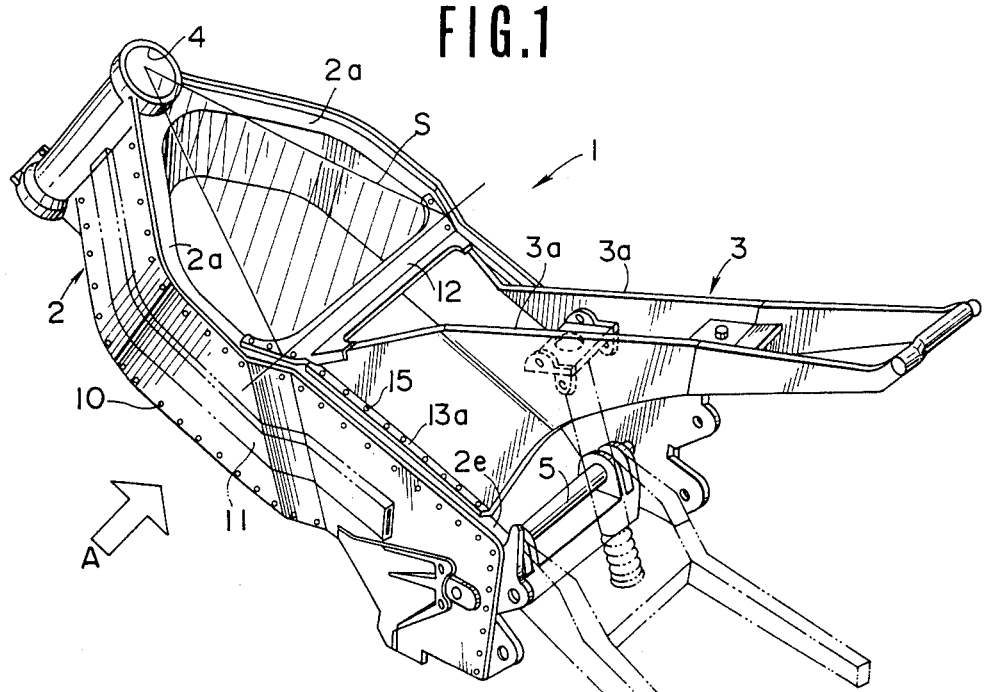
FIG. 1 is a perspective view of a frame construction for use in a motor vehicle with a saddle seat, according to an embodiment of the present invention.

FIG. 1 illustrates a frame construction 1 for use in a motor vehicle having a saddle seat, such as a two-wheeled or three-wheeled motorcycle, which is designed for the driver to ride astride thereof. The frame construction 1 generally includes a main frame 2 and a rear frame 3. The main frame 2 comprises a pair of integral panel structures 2a, 2a which are arranged substantially symmetrically with respect to a vertical plane including a longitudinal central axis of the main frame 2. The main frame 2 is shaped to extend substantially rectilinearly in side elevation as seen in the direction of the arrow A, that is, to lie substantially along a straight line interconnecting a vertically central point on a head pipe 4 attached to a front end of the main frame 2 and by which a front fork (not shown) is angularly movably supported and a central axis of a pivot 5 attached to a rear end of the rear frame 3 and by which a rear fork 6 is swingably supported.

Conventional frames, typically cradle-shaped frames for use in motor vehicles with saddle seats, comprise box-shaped frame constructions composed of pipes of rectangular or round cross section for dispersing external forces applied at various angles to the vehicle body. However, the frame construction of the present invention is in the form of a unitary frame structure, rather than being composed of many pipe members for bearing applied forces. The main frame 2 has an integral structure and is capable of withstanding external forces applied at various angles thereto, as described hereinbelow.

Figure 2:
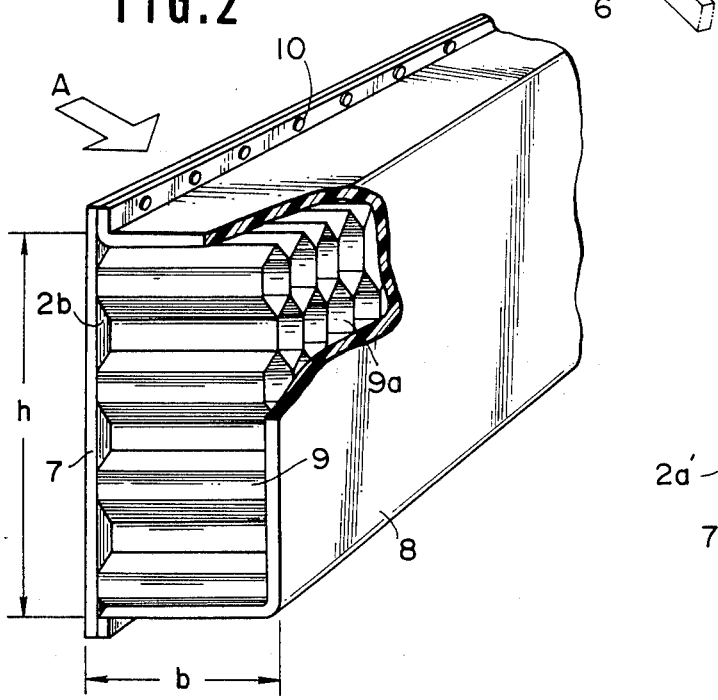
FIG. 2 is a fragmentary perspective view, partly broken away, of a frame material employed in a main frame of the frame construction shown in FIG. 1.

As shown in FIG. 2, each of the panels 2a of the main frame 2 is constructed of an elongated hollow body of a rectangular cross section comprising an outer plate 7 and an inner channel member 8 which are pressed and made of thin sheet steel, aluminum, FRP, or CFRP, and a honeycomb core 9 filled in a space 2b in the hollow body and having a multiplicity of independent cells or chambers 9a. The honeycomb core 9 is disposed in the hollow body such that the chambers or isolated holes 9a open substantially perpendicularly to inner surfaces of the plate 7 and the channel member 8 or longer sides of the rectangular cross section of the hollow body, thereby achieving a mechanical strength inherent in the honeycomb structure for withstanding applied forces. With the honeycomb core 9 used as a reinforcement member in the frame panel, the panel can sufficiently withstand external forces applied in the direction of the arrow (FIG. 2), is rendered lightweight, and provides a necessary cross section. The outer plate 7 and the inner channel members 8 are joined together by pop rivets 10 staked on longitudinal edges thereof.

The relationship between the panel 2a and the honeycomb core 9 will now be described in greater detail. The rectangular cross section of the panel structure shown in FIG. 2 has a width and a height which are different from each other. If the panel structure were considered as being a single unitary beam with a width b mm greater than a height h mm, then the panel structure would have a poor rigidity or mechanical strength or section modulus against external forces applied in the direction of the arrow A shown in FIGS. 1 and 2. To cope with this problem, the honeycomb core 9 is filled in the panel structure such that the holes or cells 9a open perpendicularly to opposing walls of the plate 7 and the channel member 8, thus providing an increased mechanical strength or rigidity against external forces imposed in the longitudinal direction of the holes 9a.

Figure 3:
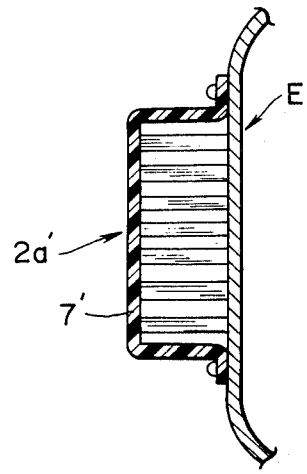
FIG. 3 is a cross-sectional view of a frame material according to a modification.

FIG. 3 shows a panel structure according to a modification. In this modification, a panel 2a' of a main frame is positioned in close contact with an engine cover or a fuel tank E. The panel 2a' includes an outer channel member 7' opening toward and fastened to a side of the engine cover or fuel tank E.

It will be understood that the smaller the dimension of the honeycomb core in the axial direction of the cells or holes 9a, the greater the rigidity of the honeycomb core as the reinforcement member against buckling stress. FIGS. 4 through 7 show frame materials or panel structures according to different embodiments of the invention, in which the internal space of the panel structure is divided by a partition or partitions into chambers or spaces filled with honeycomb cores with shorter cells or holes.

Figure 4:
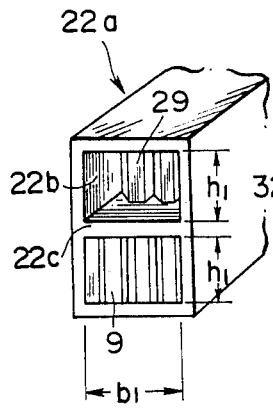
FIGS. 4 through 7 are fragmentary perspective views of frame materials according to various embodiments of the present invention.
Figure 5:
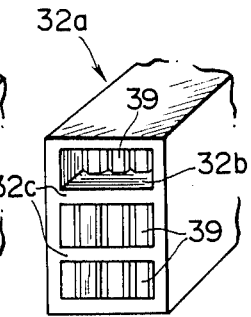
Figure 6:
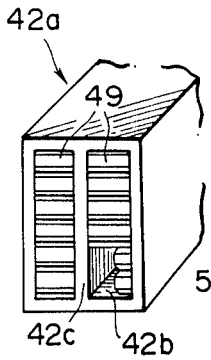
Figure 7:
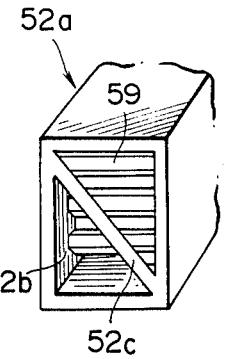

In FIG. 4, an interior space in a panel 22a is divided by a horizontal longitudinal partition 22c into chambers 22b, 22b extending longitudinally along the panel. Each of the chambers 22b has a cross-sectional shape having a width $b_1$ mm and a height $h_1$ mm, with $b_1 > h_1$. Honeycomb cores 29 are filled in the chambers 22b, respectively, with honeycomb cells opening perpendicularly to the partition 22c. FIG. 5 shows a panel 32a having an interior space divided by two horizontal longitudinal partitions 32c into three chambers 32b filled with honeycomb cores 39 having honeycomb cells opening perpendicularly to the paritions 32c. A panel 42a illustrated in FIG. 6 includes a vertical longitudinal partition 42c dividing an interior space into two chambers 42b filled with honeycomb cores 49 having honeycomb cells opening perpendicularly to the partition 42c. FIG. 7 illustrates a panel 58a having an interior space divided by a diagonal longitudinal partition 52c into chambers 52b of triangular cross section filled with honeycombs 59 of triangular cross section having honeycomb cells opening toward the diagonal partition 52c.

The panel structure according to the present invention is suitable for use not only as a frame material for a two-wheeled motorcycle but also as a chassis material for various motor vehicles such as agricultural machines. The panel structure is much more lightweight and can be designed and manufactured in a much smaller number of steps than conventional frame materials. The honeycomb panel structure has a heat insulating capability for preventing engine heat from affecting the driver riding astride of the motor vehicle. The number of partitions in the panel structure is selected to meet an external load imposed on the main frame. This provides for greater freedom in designing the frame construction. The panel structure is capable of meeting the requirements for an increased rigidity and a lighter weight, resulting in a large cost reduction.

Figure 8:
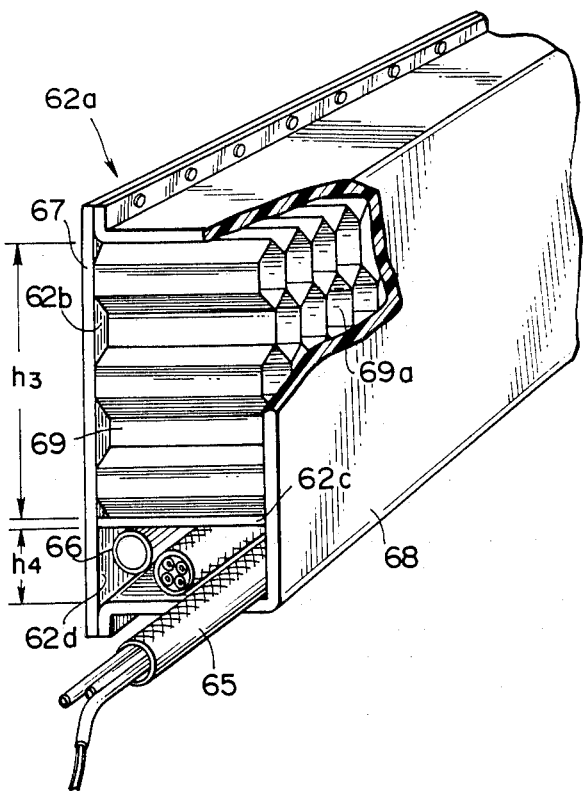
FIG. 8 is a view similar to FIG. 2, showing a frame material according to another embodiment of the invention.

FIG. 8 illustrates a panel structure according to still another embodiment. A panel 62a includes a hollow body of rectangular cross section that is vertically elongated. The hollow body has an interior space divided into an upper chamber 62b having a height $h_3$ and filled with a honeycomb core 69 and a lower cavity 62d having a height $h_4$. In the cavity 62d, there are accommodated an electric harness 65 and hydraulic and pneumatic tubes 66. The chamber 62b and the cavity 62d are divided by a partition 62c which allows the parts to be assembled easily and doubles as a reinforcement rib. The cavity 62d may be used partly as a parts storage chamber.

Figure 9:
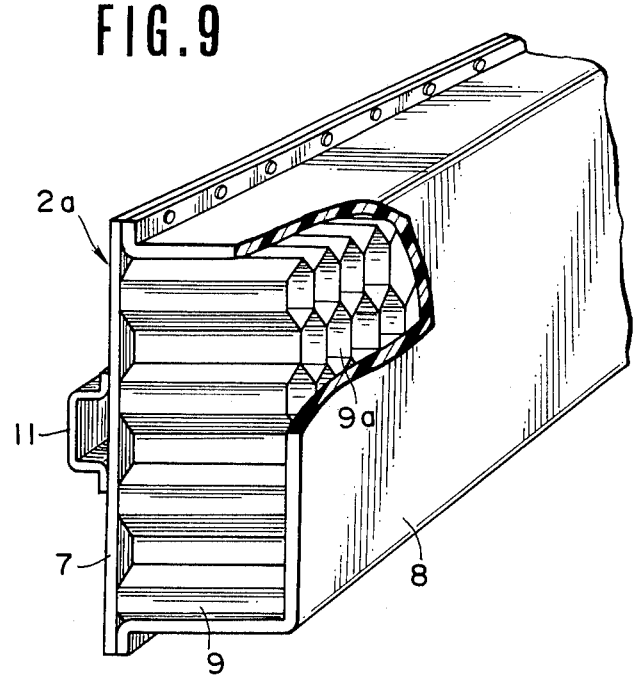
FIG. 9 is a view similar to FIG. 2, illustrating still another frame material with a reinforcement member attached to a side thereof.

FIG. 9 shows a panel structure 2a serving as a frame material and including a reinforcement member 11 of a substantially channed-shaped cross section attached to one side thereof. The reinforcement member 11 may be disposed on an inner side, an outer side, or each of both sides of the panel 2a, and may extend continuously the full length of the panel 2a, or discontinuously or partly on the panel 2a. The reinforcement member 11 may be welded or otherwise fastened to the panel 2a. FIG. 1 shows the reinforcement member 11 attached to an outer side of the panel 2a along substantially the entire length thereof as indicated by the dot-and-dash lines.

Figure 10A:
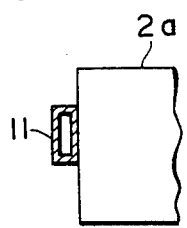
FIGS. 10(a), 10(b), 10(c), 10(d), and 10(e) are cross-sectional views showing different reinforcement members.
Figure 10B:
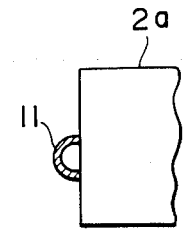
Figure 10C:
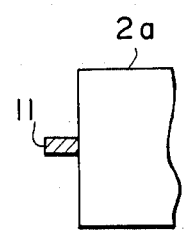
Figure 10D:
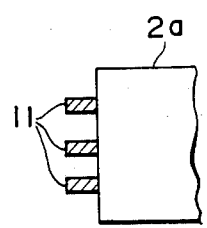
Figure 10E:
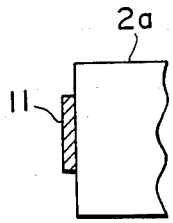

The reinforcement member 11 may be of various cross-sectional shapes. FIGS. 10(a) and 10(b) show hollow reinforcement members 11 having rectangular and semicircular cross sections, respectively. FIG. 10(c) illustrates a solid bar-shaped reinforcement member 11 mounted edgewise on the panel 2a. FIG. 10(d) shows three laterally-spaced solid bar-shaped reinforcement members 11 and mounted edgewise on the panel 2a. FIG. 10(e) illustrates a solid plate-shaped reinforcement member 11 mounted flatwise on the panel 2a.

The rear frame 3 mounted on a rear upper surface of the main frame 2 and extending upwardly in a rearward direction will be described with reference to FIG. 1. The rear frame 3 serves as a framework for supporting a driver's seat or saddle thereon. The rear frame 3 comprises a pair of symmetrical pressed panel structures 3a, 3a spaced from each other and each including a honeycomb core 9 (FIG. 11) filled therein similar to the main frame 2. The panels 3a, 3a have lower edges fastened respectively to the panels 2a, 2a of the main frame 2 and also have lower front edges joined to a cross member 12 transversely interconnecting the main frame panels 2a, 2a. Therefore, the main frame panels 2a, 2a and the rear frame panels 3a, 3a are transversely coupled by the cross member 12. The cross member 12 is positioned such that the cross member 12 and the main frame panels 2a, 2a jointly constitute a frame structure S in the form of substantially an isosceles triangle with the cross member 12 serving as the base and the head pipe 4 as a vertex subtending the cross member 12.

Figure 11:
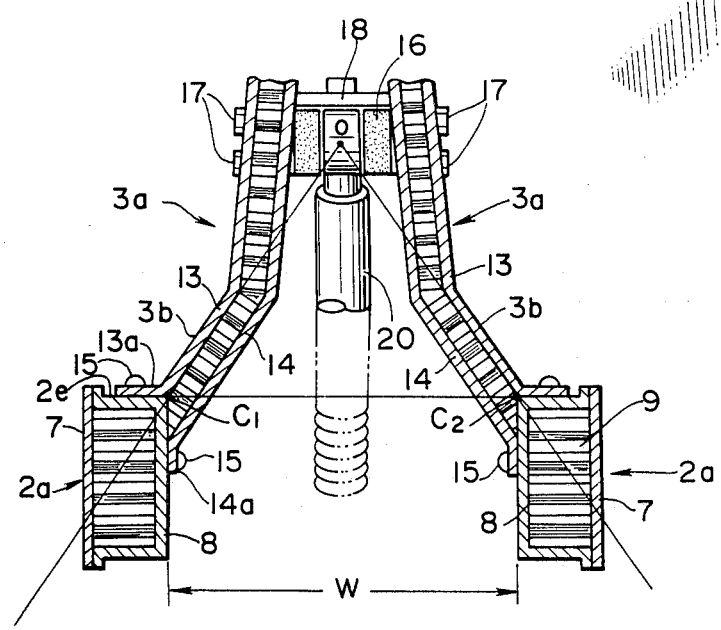
FIG. 11 is a cross-sectional view of an assembly comprising of a main frame, a rear frame, and a rear cushion unit.

The rear frame 3 is assembled as shown in FIG. 11. More specifically, the panels 3a, 3a include lower diverging portions 3b, 3b spreading progressively away from each other in a downward direction. Straight lines passing through and along the panel portions 3b, 3b and a line connecting upper edges of the main frame panels 2a, 2a which are spaced a distance W, jointly form a triangle $O-C_1-C_2$. The main and rear frames are designed so that the weight of the rear frame 3 and stresses applied to the rear frame 3 are imposed on the main frame panels 2a, 2a in a direction from the vertex O to provide very stable stress balancing in the frame construction. The rear frame panels 3a, 3a include lower bent flanges 13a, 13a of outer plates 13 and lower bent flanges 14a, 14a of inner plates 14. The flanges 13a of the outer plates 13 are fastened such as by pop rivets or bolts 15 to rear upper surfaces 2e of the main frame panels 2a, 2a, while the flanges 14a of the inner plates 14 are fastened such as by pop rivets or bolts 15 to rear inner surfaces of the main frame panels 2a, 2a. The panels 2a, 3a are coupled to each other through the rear upper surfaces 2e each having a sufficient length L (FIG. 1) and area and the flanges 13a. The upper edges of inner plates 8 of the main frame panels 2a and the lower edges of the outer plates 13 of the rear frame panels 3a are joined together at the vertexes $C_1$, $C_2$ of the triangle $O-C_1-C_2$.

Figure 12:
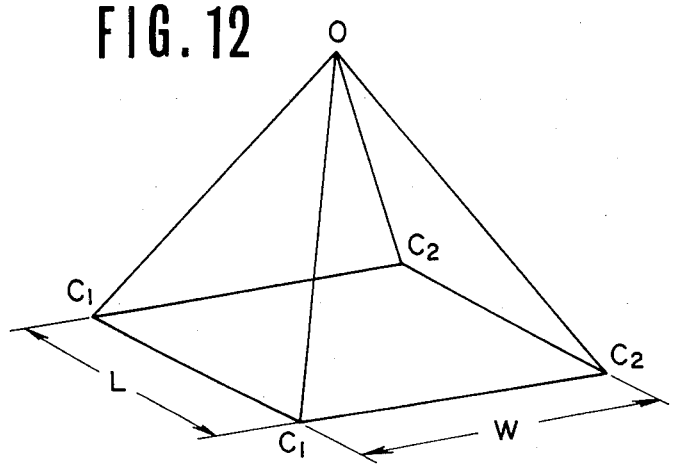
FIG. 12 is a diagram schematically illustrative of a support structure for the rear cushion unit.

The rear frame panels 3a, 3a have intermediate portions located close to each other. A rear cushion unit 20 has an upper end coupled by bolts 17 through rubber mounts 16 to the panels 3a, 3a at a position between the intermediate close portions, which corresponds to the vertex O of the triangle $O-C_1-C_2$. FIG. 12 schematically illustrates a quadrangular pyramid including one base having the length thereof equal to the length L of the flanges 13a fastened to the panels 3a, 3a and another base having the length thereof equal to the width W between the panels 2a, 2a. The rear cushion unit 20 is suspended from the vertex of the quadrangular pyramid, which coincides with the vertex O. This arrangement provides very stable stress balancing in the overall frame construction to prevent any stress from being localized in any particular frame component. Designated at 18 is a support plate from which is suspended a rear suspension including the rear cushion unit 20.

Figure 13:
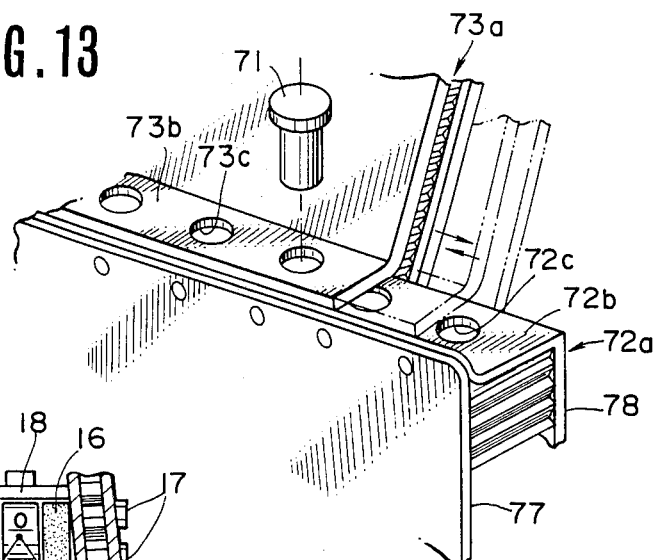
FIG. 13 is a fragmentary enlarged perspective view of main and rear frames which are positionally adjustably attached to each other.

FIG. 13 is illustrative of a modification in which a rear frame is positionally adjustably attached to a front frame. A main frame panel 72a includes a rear upper surface having a number of attachment holes 72c defined therein in the form of elliptical holes, through holes, or internally threaded holes spaced at equal intervals or pitches. A rear frame panel 73a includes a flange 73b having a number of attachment holes 73c defined therein in registry with the attachment holes 72c. The relative position between the main and rear frames can be varied by relatively displacing attachment holes 72c, 73c in increments equal to the hole-to-hole intervals. The flanges 72b, 73b are fastened by fasteners 71 (only one shown) such as bolts, rivets, or studs, for example, passing through the aligned attachment holes 72c, 73c. If one of the paired attachment holes 72c, 73c is an oblong hole, then a bolt and nut is selected as a fastener for coupling the flanges 72b, 73b. With this arrangement, the positional adjustment of the rear frame with respect to the front frame can be carried out not only by a manufacturer's factory or a repair shop but also by a user.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A frame construction for use in a motor vehicle having front and rear forks, comprising:
    (a) a main frame including a head pipe for supporting the front fork angularly movably and a pivot for supporting the rear fork swingably;
    (b) said main frame comprising a pair of right and left first structures and a cross member interconnecting said first structures, each said first structure comprising an elongated hollow body having a rectangular cross section and a honeycomb member disposed in said hollow body and having a multiplicity of independent divided chambers;
    (c) said honeycomb member being arranged such that said divided chambers have central axes directed substantially perpendicularly to longer sides of the rectangular cross section of said hollow body;

(d) each said first structure of said main frame extending substantially rectilinearly in side elevation along a line interconnecting said head pipe and said pivot; and (e) said pair of first structures and said cross member jointly constituting substantially an isosceles triangle with said head pipe located in plan at a vertex subtending said cross member.

2. A frame construction according to claim 1, wherein said first structure has a cavity extending longitudinally in said hollow body and free of said honeycomb member.

3. A frame construction according to claim 1, including a rear frame having one end coupled to a rear upper surface of said main frame and extending upwardly in a rearward direction, said rear frame and said main frame being joined together through flat surfaces having sufficient areas.

4. A frame construction according to claim 1, wherein each said first structure has a reinforcement member attached to a side thereof and extending there along.

5. A frame construction according to claim 4, wherein said reinforcement member extends along substantially the entire length of said first structure with which it is associated.

6. A frame construction for use in a motor vehicle having front and rear forks, comprising:
(a) a main frame including a head pipe for supporting the front fork angularly movably and a pivot for supporting the rear fork swingably;
(b) said main frame comprising a first structure comprising an elongated hollow body having a rectangular cross section and a honeycomb member disposed in said hollow body and having a multiplicity of independent divided chambers;
(c) said honeycomb member being arranged such that said divided chambers have central axes directed substantially perpendicularly to longer sides of the rectangular cross section of said hollow body;
(d) said main frame extending substantially rectilinearly in side elevation along a line interconnecting said head pipe and said pivot; and
(e) a rear frame which is positionally adjustable in a longitudinal direction of said main frame on a surface thereof to which said rear frame is joined.

7. A frame construction for use in a motor vehicle having front and rear forks, comprising:
(a) a main frame including a head pipe for supporting the front fork angularly movably and a pivot for supporting the rear fork swingably;
(b) said main frame comprising a first structure comprising an elongated hollow body having a rectangular cross section and a honeycomb member disposed in said hollow body and having a multiplicity of independent divided chambers;
(c) said honeycomb member being arranged such that said divided chambers have central axes directed substantially perpendicularly to longer sides of the rectangular cross section of said hollow body;
(d) said main frame extending substantially rectilinearly in side elevation along a line interconnecting said head pipe and said pivot; and
(e) said main frame comprises a pair of said first structures arranged substantially symmetrically with respect to a vertical plane including a longitudinal central axis of the main frame, said first structures having distal ends coupled to said head pipe, and a cross member extending transversely and interconnecting said first structures, said pair of first structures and said cross member jointly constituting substantially an isosceles triangle with said head pipe located in plan at a vertex subtending said cross member.

8. A frame construction according to claim 7, wherein said rear frame comprises a second structure comprising a honeycomb member and inner and outer plate members sandwiching said honeycomb member therebetween.

9. A frame construction according to claim 8, wherein said rear frame comprises a pair of said second structures arranged substantially symmetrically with respect to the vertical plane including the longitudinal central axis of said main frame.

10. A frame construction according to claim 9, wherein said second structures include lower portions adjacent to ends thereof coupled to said main frame and spreading away from each other toward said ends coupled to said main frame.

11. A frame construction according to claim 10, wherein said outer plate members of said pair of second structures have lower edges joined to upper edges of inner sides of said pair of first structures.

12. A frame construction according to claim 10, wherein said pair of second structures have intermediate portions arranged close to each other, including a rear cushion unit having an upper end supported between said intermediate portions.

* * * * *